March 22, 1949. M. S. MEAD, JR 2,465,110
ANTIHUNT CIRCUIT FOR REGULATING SYSTEMS
Filed Sept. 12, 1947

Inventor:
Milton S. Mead, Jr.,
by [signature]
His Attorney.

Patented Mar. 22, 1949

2,465,110

UNITED STATES PATENT OFFICE 2,465,110

ANTIHUNT CIRCUIT FOR REGULATING SYSTEMS

Milton S. Mead, Jr., Schenectady, N. Y., assignor to General Electric Company, a corporation of New York Application September 12, 1947, Serial No. 773,533

4 Claims. (Cl. 171—123)

1

This invention relates to regulating systems and in particular to an improved anti-hunt control circuit for electron discharge devices adapted for use in a frequency regulating system.

An object of the invention is to provide a simple, reliable anti-hunt control circuit for electron discharge devices used in regulating and servo systems which are subject to objectionable hunting. For illustration, the circuit is herein described in connection with a frequency regulating system.

On existing alternating current distribution systems the frequency variation is often too great to permit its utilization for the operation of electrical devices whose operation depends upon a source of supply having a substantially constant frequency. Therefore, such systems must be regulated so as to supply power of constant frequency. However, many such regulating means are subject to hunting, that is to say, for example, the regulating means, as it seeks the predetermined frequency, tends to oscillate more or less about said predetermined frequency point and so causes erratic operation of the device powered by said regulating means. In the practice of the prior art pertaining to the present invention, it was necessary to resort to complicated circuits involving the use of many tubes involving amplifiers and rectifiers with suitable filters to overcome the aforementioned tendency of a regulating system, such as described above, to oscillate. However, the present invention provides a greatly simplified circuit and reduces the number of tubes utilized.

It is, therefore, a further object of the present invention to provide a simple circuit adapted to overcome hunting encountered in regulating systems of the type above described.

Another object of the present invention is to provide a circuit utilizing a single electron discharge device which is adapted to perform multiple functions in connection with said circuit.

A further object of the present invention is to provide a new and improved circuit utilizing an electron discharge tube wherein changes in the current output of said device are fed back to the grid thereof to stabilize a regulating system of the type above described.

The foregoing and other objects and features of the present invention which provide the means for overcoming this objectionable phenomenon and which are believed to be novel will be pointed out in the claims appended hereto. For a better understanding of the invention, reference is made to the following drawing in which, Fig. 1 is a

Figure 4:
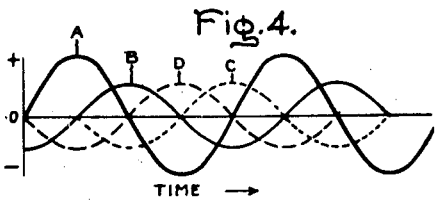
Figure 2:
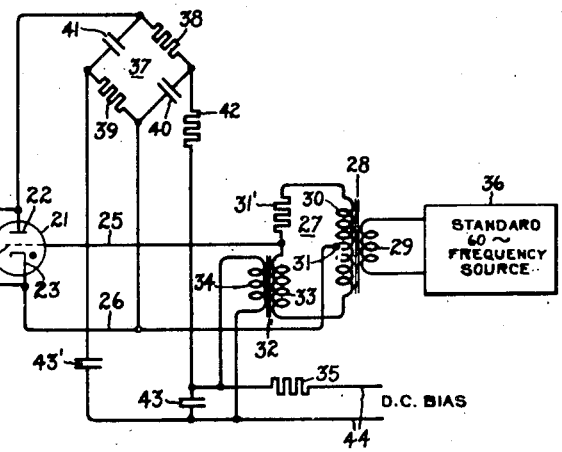
Figure 2:
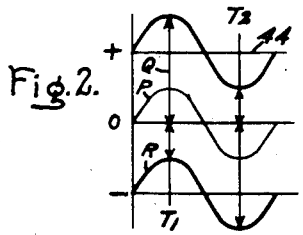
Figure 3:
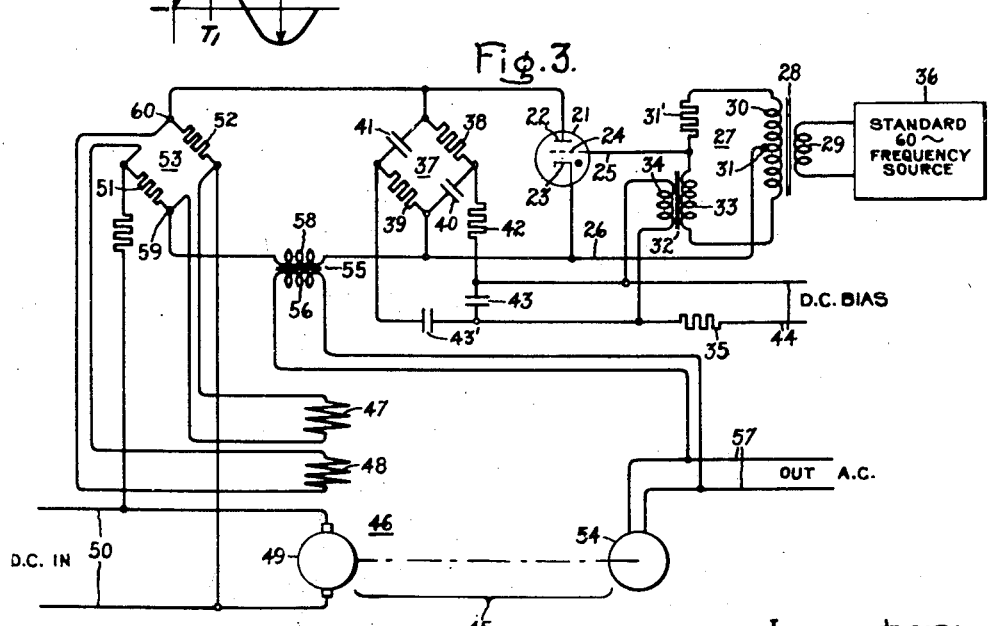

2 schematic diagram of a regulated alternating current source embodying the present invention; Fig. 2 is a graphic representation of the operation of the invention in connection with Fig. 1; Fig. 3 is a schematic diagram illustrating the use of the present invention in connection with a motor-generator system, and Fig. 4 is a graphic illustration of the operation of the present invention in connection with the system shown in Fig. 3.

Figure 1:
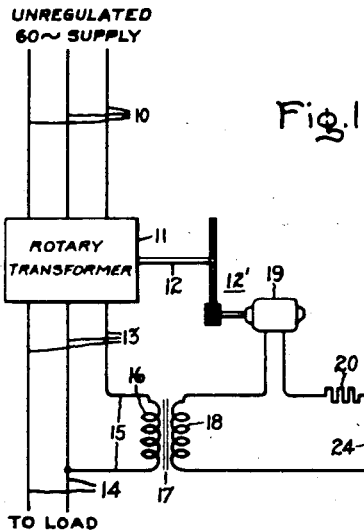

Referring now to the drawing wherein like parts in Figs. 1 and 3 are designated by like reference characters, a source of power 10 may be taken to represent a commercial alternating current distribution system connected to energize an alternating current machine 11, such as a rotary transformer of the wound rotor type or a differential Selsyn. The primary winding of the machine 11 is preferably connected to the source 10 and may be provided with some well-known form of starting connection. The machine 11 in this particular embodiment serves as a transformer between two systems, but one in which the output frequency can differ from the primary frequency by a factor proportional to the speed at which the rotor is turned or is allowed to turn.

The secondary member or rotor of the machine 11 is provided with a conventional secondary rotor winding for the purpose indicated above and is also provided with a shaft 12. The secondary winding of the rotor member is connected to a utilization system 13 which may be three phase as illustrated, or single phase if desired. The circuit 14 represents a single phase load circuit connected to be energized from system 13 at the desired frequency, for example, 60 cycles per second. In order to provide a voltage containing a component proportional to any deviation from the desired frequency of machine 11, I provide a circuit 15 which is connected to the unloaded phase of the circuit 13, or any other suitable phase voltage. The circuit 15 is connected to energize a primary winding 16 of a transformer 17 which is provided with a secondary winding 18. The secondary winding 18 is connected to energize in series relation a motor 19, a stabilizing resistor 20, and the anode-cathode circuit of an electron discharge device 21, which may be of the gaseous discharge type known as a thyratron. The device 21 is provided with an anode 22, a cathode 23, and a control electrode or grid 24. As shown, the anode-cathode circuit of tube 21 in this series connection will be responsive to any frequency variation in the voltage applied thereto.

The series motor, in this particular embodiment, serves as a torque-balancing device and is suitably geared, by gearing 12', to the shaft 12 of the induction motor 11. In this capacity said series motor tends to maintain the rotor secondary of the induction motor 11 at proper speed to produce the desired frequency output in the system 13. Details of the aforementioned series motor arrangement are described and claimed in my copending application S. N. 773,532 filed September 12, 1947, and assigned to the assignee of the present application.

Means for controlling the magnitude of the current flowing in the series motor 19, and, therefore, the speed thereof is accomplished as follows. Connected between the grid 24 of thyratron 21 and the cathode 23 thereof by a pair of conductors 25 and 26 is a phase-control network 27 which is illustrated as being of the static type comprising a transformer 28 having primary and secondary windings 29—30 and a center tap 31 on said secondary winding connected to conductor 26. Connected in series relation across winding 30 is a resistor 31' and a saturable reactor 32, the junction of the secondary winding 33 of said reactor and the resistor 31' being connected to the conductor 25 and thus to grid 24. The saturable reactor 32 is provided with a winding 34 which is connected through a current adjusting resistor 35 to a source of direct current or bias potential 44. A source of alternating current 36, having a fixed standard frequency, for example, of 60 cycles per second is connected to the primary winding 29. The aforementioned source of alternating current represents the standard to which the system 13 is to be synchronized.

Connected between the anode 22 and the cathode 23 is a phase shift feed-back network 37 consisting of resistors 38—39 and capacitors 40—41. This network is designed to shift, by ninety degrees, the low frequency component of the thyratron anode voltage which would be present if hunting occurred. In general, these hunting-frequency components have frequencies substantially below 60 cycles per second. A current adjusting resistor 42 is connected in series relation with an output circuit from the network 37 across winding 34 for setting the amount of feed-back current applied to the winding 34.

In order to bypass frequencies of 60 cycles per second, or higher components, from the winding 34 of the reactor 32 a capacitor 43 is connected across winding 34. A capacitor 43' is also connected in series relation with the output current of network 37 to block the direct current component of the thyratron anode circuit voltage from the saturating winding 34.

The operation of the embodiment of my invention illustrated in Fig. 1 is substantially as follows:

Assume hunting exists at a low frequency which will be designated as $p$ cycles per second. As a result, the average anode voltage of device 21 will swing at said frequency $p$ in phase with the phase angle swing between the voltage of anode 22 and the voltage of grid supply 36. The feed-back network 37 is arranged to provide, at the hunting frequency $p$, a current output which lags behind the average anode voltage swing substantially 90 degrees in time. This last-named feed-back voltage is actually a pulsating voltage since it includes a component due to the average direct current voltage of the thyratron 21.

By means of the fixed direct current bias source 44, the effect of the phase of the low frequency $p$ current in the reactor winding 34 is reversed 180 degrees. Therefore, the effect of this low frequency current (lagged 90 degrees by the anode bridge circuit 37) on the saturable reactor 32 is to swing, at the hunting frequency $p$, the phase of the grid signal, furnished by the source 36, ninety degrees leading in time. This becomes evident from the graph of Fig. 2 wherein the low frequency current (curve P) is superimposed on the direct current (bias source 44) with the polarity of said bias source so connected in said circuit as to increase the amount of current flowing in the winding 34 at time $T_1$, whereas, if the low frequency current (curve P) were superimposed on the bias current with the polarity of said bias source reversed with respect to the first case, the amount of current in the winding 34 at time $T_1$ would diminish. Therefore, the effect of the phase angle of the output voltage of the network 27 is reversed 180 degrees in time as indicated by the relation between points at $T_1$ and $T_2$. Preferably, this swing is adjusted in magnitude to give one-half to three-fourths the anode current change caused by the signal (frequency $p$) which creates the swing. As a result, excellent damping is provided and hunting obviated.

Satisfactory results have been obtained when the thyratron 21 is operated over a grid angle of thirty to one hundred and fifty degrees (plus or minus sixty degrees from the 90 degree control point), and the feed-back network 37 plus the phase shift network 27 is designed to produce a swing of the grid signal of plus or minus thirty degrees for a plate current change corresponding to the plus or minus sixty-degree swing. This provides an anode current having a range of approximately .06 to .93 per cent of maximum possible current.

Fig. 3 illustrates another embodiment of the present invention adapted for use in a frequency controlled motor-generator set 45 comprising a motor 46 with shunt field windings 47—48. The motor 46 is provided with an armature 49 connected across a source of direct current 50 while the fields of said motor are connected to a pair of resistors 51—52 to form a bridge arrangement 53. The motor 46 is coupled to an alternating current generator 54. A portion of the output of said generator is applied to a transformer 55, provided with a primary winding 56 which is connected across the alternating current output system 57 and a secondary winding 58 connected between the cathode 23 and a junction 59 of bridge circuit 53. An opposite junction 60 of said bridge circuit is connected to the anode 22. The feed-back network 37 is connected in the circuit in the same manner as previously described in connection with Fig. 1.

The operation of the anti-hunting feature of the present invention with respect to its use in the circuit illustrated in Fig. 3 is substantially as follows:

Normally, the currents in the fields 47—48 are of such magnitude as to maintain the motor 46 speed and consequently the generator 54 speed at a value to produce therefrom an alternating current whose frequency is at the desired value, for example 60 cycles per second. Assume now that for any variety of circumstances the motor speed tends to change. This would result in a departure from the desired frequency output of 60 cycles per second. However, when this tendency occurs, the phase relation between the output on the system 57 and the grid signal 36 is altered in the manner above described in connection with Fig. 1. As a result, more or less current is caused to flow in the anode circuit of device 21 and this change in current flow serves to augment or diminish the current in the fields 47—48 and consequently causes the motor 46 to maintain a constant speed, thereby to cause the generator 54 to produce the desired frequency output. This maintenance of constant speed of the motor 46 is accomplished substantially entirely without hunting for the reasons which will become apparent from a consideration of Fig. 4.

In Fig. 4, the curve A represents the rotor velocity of the motor 46 during hunting (minus the constant rotational velocity), the curve B represents the rotor displacement angle from an arbitrary reference after the rotational angle is subtracted. The curve C represents the corrective motor field current furnished by the thyratron 21, hence the corrective motor torque, and curve D, illustrates the effect of advancing curve C by 90 degrees.

The torque, represented by C, is proportional to the deflection (rotor displacement) but in an opposite direction as indicated by the curves B and C. This spring-like torque combined with the inertia of the armature forms an oscillatory mechanical system. However, it will be observed that the effect of advancing the curve C by ninety degrees produces a torque (curve D) in opposite phase to the rotor velocity (curve A) which is changing. This is a damping torque, therefore, in order to secure such damping, the phase, of that component of thyratron anode current which occurs at hunting frequency, is advanced. This is accomplished by the low-frequency, feed-back bridge circuit 37 plus the saturable winding 34.

From the aforegoing description it can be observed that the invention is readily adapted to any phase controlled thyratron circuit where the error signal is a phase angle.

While the embodiments of the present invention as above described are only illustrative of the possibilities thereof, it should be understood that many modifications are possible. Therefore, it is intended to cover by the appended claims all such modifications that come within the scope and spirit of the present invention.

What I claim as new and desire to secure by Letters Patent of the United States is:

1. An electric circuit comprising an electron discharge device having at least an anode, a cathode and a control grid, a source of alternating current to be regulated, a signal source having a predetermined frequency, means for connecting said first-mentioned source of current between said anode and cathode, a phase determining network, said phase determining network including a resistor and a saturable reactor having an alternating current winding and a direct current winding, a source of direct current for exciting the direct current winding of said saturable reactor, means for connecting said phase-determining network between said signal source and said grid, and a resistive-capacitive network comprising a four-legged circuit loop having resistors in two opposite legs and capacitors in the other legs, two opposite corners of said four-legged loop being connected between anode and cathode of said discharge device, so that a voltage is provided across the other two corners of the four-legged loop which lags the anode-cathode voltage, connections for superimposing a lagging component of current provided by the lagging voltage on the source of direct current associated with said phase-determining network, thereby to alter the phase of said signal source to maintain said first-mentioned current source substantially in phase with said signal source.

2. In combination, a source of alternating current, a dynamoelectric machine adapted to be energized by said alternating current source and having a rotor member arranged to provide an output voltage, an electron discharge device having at least an anode and a cathode and a grid, an electric motor coupled to said rotor and having a winding thereof in series with the anode-cathode circuit of said discharge device and both connected to be energized in response to said last-mentioned voltage, said anode-cathode circuit being adapted to produce in accordance with any change in said rotor speed a varying current flow in the winding of said motor and a varying potential in the anode-cathode circuit of said discharge device, an electric network connected in the anode-cathode circuit for providing a current in the output circuit thereof lagging said anode-cathode varying potential, a phase-shift network connected in the cathode-grid circuit of said discharge device, and means for introducing the lagging component of current from said first-named network to said phase-shift network so as to reverse the time-phase effect of the varying potential in said anode-cathode circuit thereby producing a current flow in said motor winding to maintain the dynamo-electric machine output frequency constant and free from hunting or undesired oscillations.

3. In combination, a source of alternating current, a dynamoelectric machine adapted to be energized by said alternating current source and having a rotor member arranged to provide an output voltage, an electron discharge device having at least an anode and a cathode and a grid, a series motor coupled to said rotor and having a winding thereof in series with the anode-cathode circuit of said discharge device and both connected to be energized in response to said last-mentioned voltage, said anode-cathode circuit being adapted to produce in accordance with any change in said rotor speed a varying current flow in the winding of said motor and a varying potential in the anode-cathode circuit of said discharge device, an electric network connected in the anode-cathode circuit for providing a current in the output circuit thereof lagging said anode-cathode varying potential, a phase-shift network connected in the cathode-grid circuit of said discharge device, and means for introducing the lagging component of current from said first-named network to said phase-shift network so as to reverse the time-phase effect of the varying potential in said anode-cathode circuit thereby producing a current flow in said motor winding to maintain the dynamoelectric machine output frequency constant and free from hunting or undesired oscillations.

4. In combination, a source of direct current, a motor-generator set, the motor thereof being provided with shunt field windings adapted to be energized by said current source and the generator thereof being arranged to provide an alternating current the frequency of which is proportional to the speed of said motor, an electron discharge device having at least an anode and a cathode and a grid, means for connecting the shunt field windings of said motor in the anode-cathode circuit of said discharge device, said anode-cathode circuit being adapted to produce in accordance with any change in said motor speed a varying current flow in the field windings of said motor and a varying potential in the anode-cathode circuit of said discharge device, a resistance-capacitance network comprising a four-legged circuit loop having resistors in two opposite legs and capacitors in the other legs, two opposite corners of said four-legged loop being connected between anode and cathode of said discharge device, so that a voltage is provided across the other two corners of the four-legged loop which lags the anode-cathode varying potential, a phase-shift network comprising a saturable-core transformer and a resistor in series with the transformer secondary connected in the cathode-grid circuit of said discharge device, and circuit means for introducing the lagging voltage from said resistance capacitance network to the primary of the saturable-core transformer in said phase-shift network so as to reverse the time-phase effect of the varying potention in said anode-cathode circuit thereby producing a current flow in said field winding to maintain the motor speed (and generator output frequency) constant and free from hunting or undesired oscillations.

MILTON S. MEAD, Jr.

REFERENCES CITED

The following references are of record in the file of this patent:

UNITED STATES PATENTS

| Number | Name | Date |
| --- | --- | --- |
| 2,213,882 | Ludbrook | Sept. 3, 1940 |
| 2,248,929 | Adler | July 13, 1941 |
| 2,270,799 | Gulliksen | Jan. 20, 1942 |
| 2,319,625 | Ostrander | May 18, 1943 |